UNITED STATES PATENT OFFICE.

RUBEN ZERTUCHE, OF TORREON, MEXICO.

PROCESS OF TREATING RUBBER AND THE PRODUCT PRODUCED THEREBY.

1,302,266.     Specification of Letters Patent.     Patented Apr. 29, 1919.

No Drawing.     Application filed August 10, 1916.     Serial No. 114,256.

*To all whom it may concern:*

Be it known that I, RUBEN ZERTUCHE, a citizen of Mexico, and a resident of Torreon, Mexico, have invented certain new and useful Improvements in Processes of Treating Rubber and the Product Produced Thereby, of which the following is a specification.

As is well known, rubber goods soon harden and become brittle and deteriorate to such an extent as to in a comparatively short time lose their elasticity and when adapted to hold water or other liquids they soon leak and become useless.

It is the object of my invention to treat the raw material so as to lengthen materially the durability of the rubber by adding to its elasticity and thus extend the life time of the articles of which it is made, and to treat articles already made and which have partially deteriorated so as to restore their elasticity and increase the normal period of use.

I have found in the ordinary treatment of rubber many valuable ingredients are washed away or eliminated from the stock in the form in which it is ready for commercial use and that by subjecting the raw rubber in course of treatment to certain preservative juices the elasticity of the rubber is added to and that the rubber articles made therefrom last very much longer than the ordinary product, retaining its elasticity for a very much longer period and resisting the hardening action now so common which soon ends in disintegration. I have discovered not only that I may thus treat the raw rubber material but that even after articles have been formed and vulcanized that my treatment will check disintegration and deterioration, reviving the rubber and give new elasticity and life.

My treatment also enables me to utilize filler materials with the raw material so as to lessen the cost without in any way impairing the efficiency of the product.

I find that the common mesquite plant (Ramillo de mesquite, a branch of *Prosopis juliflora* DC) produces such a preserving juice and is readily extracted from the branches and leaves. Gobernadora (Ramillo de gobernadora, a branch of *Covillea tridentata*) a shrub which grows wild in Mexico (as does also the mesquite) contains this juice also and it may be extracted from the holm-oak, (belonging to the genus *Quercus* botanically allied to *Q. grisea*) Cascalote (the seed pod or legume of *Cæsalpinia coriaria willd*) and other plants.

The juice or sap is taken from these plants in any suitable manner but preferably by crushing the branches and leaves; adding water to the crushed stock, after which the mass is heated for a period of half an hour or an hour, and then the juices are strained off, these being of a resinous or gummy nature.

In using the plant known as gobernadora I preferably cut the small branches or leaves and then dry them in the air, after which I extract the juice therefrom by adding water as I find that by first drying the material I get better results from the leaves and branches of this plant.

With this material, I may treat what is known as the dry rubber taken from the guayule rubber bush found in great quantities in Mexico, or Palo Colorado rubber and all others belonging to what is known as the dry rubber class, or I may apply the treatment to the juice of the rubber tree known as latex.

In carrying out the process I take of the rubber either from the latex of the tree or the guayule about 60 per cent., and as a filler I may use 30 per cent. of flour, starch or yellow dextrin or brown sugar, or I may use pine pitch or other resins or the gum from the mesquite or other plants. I then add to the mixture the preserving juice as I term it, extracted from the mesquite or plants of the same general nature in about five or six pounds to the hundred pounds to be treated after which the mixture is treated like ordinary rubber, great elasticity being secured in spite of the filling material being used; the product is more durable and its life is materially extended.

The crude rubber material either with or without the filler is placed in a vessel containing the preserving juice or liquid so as to be covered thereby, moderate heat being applied for five or ten minutes, after which the material is allowed to remain in the juice from ten to twelve hours, the vessel being covered and the result will be as stated. The material thus treated may then be utilized as ordinary rubber stock in producing commercial articles.

I do not limit myself in the application of the invention as I may apply the preserving juices to the rubber milk or to the raw rubber direct without the use of filling material though I prefer to use filling material as it cheapens the product without affecting its durability or the period of its elasticity.

I have also found that greatly improved results are secured by washing the rubber in the preserving juice in lieu of water causing the retention of all the valuable ingredients in the natural rubber while at the same time adding the preservative qualities of the juices from the mesquite and like plants. After the rubber has been thus treated by washing in the preserving juices, the juices are strained off and used to wash other rubber.

In my experiments extending over a long period of time I have found that the juice expressed from certain plants gives better results with certain grades of rubber, and in connection with what is known as the dry or guayule rubber, I get the best results by using the juice extracted from the plant called the gobernadora.

In order to reëstablish the life and elasticity in rubber articles where this has been lost, or where serious deterioration has set in and the material has a tendency to become brittle, I heat the preserving juice, and as it commences to boil place the rubber article therein, allowing it to remain a few seconds, then remove it, stretch it, and reintroduce it, subjecting the articles to a rapid and successive stretching either outside or within the preserving material.

I do not limit myself to any particular filling material, as I have used 50 per cent. of dextrin added to the raw rubber, mixing the same by passing it through rollers to which heat is applied as is done when sulfur is added, adding also ten per cent. of sulfur and after thorough mixing I place the product in a heated mold in a boiler vulcanizer and raise the temperature to about 307° F. maintaining this temperature for 35 minutes after which the mold is taken out and cooled.

What I claim is:

1. The process of treating rubber to increase its elasticity both as to quality and time, which consists in subjecting the rubber to the action of a resinous gummy preserving juice in its natural state, substantially as described.

2. The herein described process for preserving the elasticity of rubber both as to quality and time, which consists in subjecting the rubber to the action of a resinous gummy preserving juice in the cleansing process in lieu of water, substantially as described.

3. The herein described process for preserving the elasticity of rubber both as to quality and time, consisting in taking raw rubber, adding thereto a filler and subjecting the same to a resinous gummy preserving juice, substantially as described.

4. As a new article of manufacture, rubber having embodied therewith a preserving juice in its natural state for increasing the elasticity of the rubber both as to quality and time, substantially as described.

RUBEN ZERTUCHE.